H. W. JUSTUS.
TRAP.
APPLICATION FILED MAR. 17, 1921.

1,427,600.

Patented Aug. 29, 1922.

WITNESSES

INVENTOR
H. W. JUSTUS
BY
ATTORNEYS

UNITED STATES PATENT OFFICE.

HENRY WILLIAM JUSTUS, OF NAPANOCH, NEW YORK.

TRAP.

1,427,600.  Specification of Letters Patent.  Patented Aug. 29, 1922.

Application filed March 17, 1921. Serial No. 453,163.

*To all whom it may concern:*

Be it known that I, HENRY W. JUSTUS, a citizen of the United States, and a resident of Napanoch, in the county of Ulster and State of New York, have invented a new and Improved Trap, of which the following is a full, clear, and exact description.

This invention relates to improvements in traps, and more particularly to traps for water of condensation, an object of the invention being to provide an improved construction of trap automatically controlled by a float in the trap, the latter controlling the operation of the valve which regulates the flow and pressure to a diaphragm control for operating the outlet valve of the trap.

A further object is to improve upon the constructions illustrated in my application for patent on traps, filed October 7, 1919, and given Serial No. 329102, which was patented Oct. 12, 1920, under No. 1,355,746, and application for patent on traps, filed March 15, 1920, and given Serial No. 365983, which was patented June 7, 1921, under No. 1,380,971.

With these and other objects in view the invention consists in certain novel features of construction, and combinations and arrangements of parts, as will be more fully hereinafter described and pointed out in the claims.

In the accompanying drawings—

Figure 1:
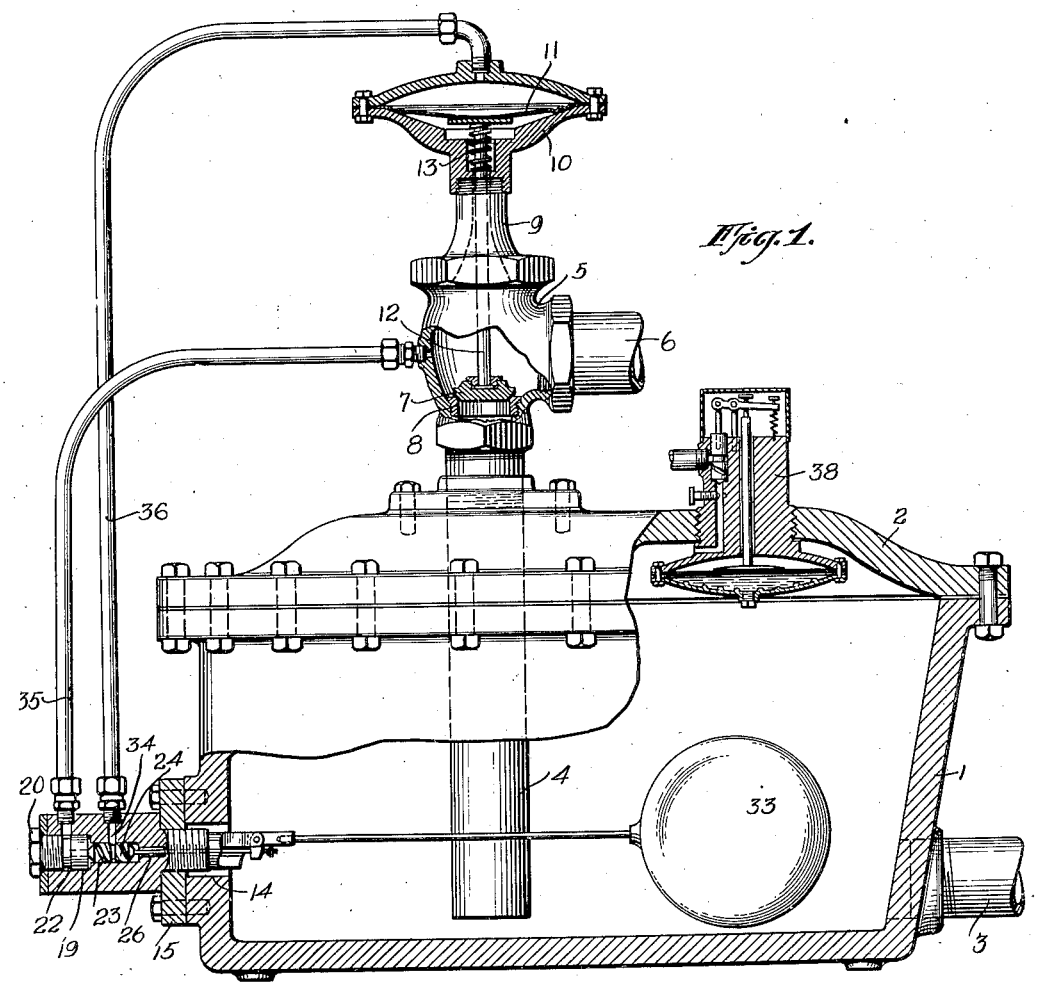
Figure 1 is a view partly in elevation, but mainly in vertical section through a trap embodying my invention.
Figure 2:
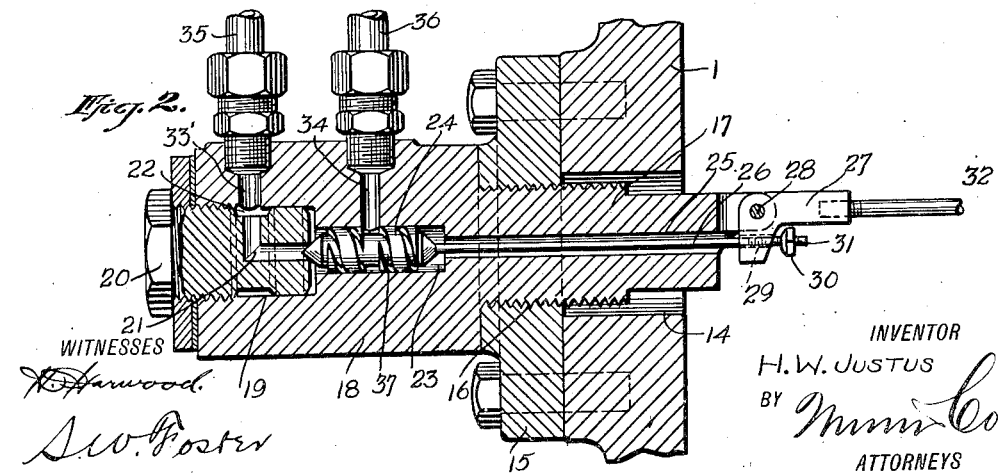
Figure 2 is an enlarged view in vertical section through the diaphragm controlling valve and its adjacent parts.

1 represents the casing of my improved trap, the latter provided with a cover 2 secured thereon and having an inlet 3 adjacent the bottom of the casing permitting a flow of water and steam from the system into the trap casing. 4 represents a discharge pipe which extends upwardly through the top of the trap casing and terminates at its lower end at a point adjacent the bottom of the trap casing.

A T-coupling 5 is secured on the upper end of the discharge pipe 4 and operates as a coupling between said discharge pipe and an outlet pipe 6 for directing the discharge to any point desired. This T-coupling 5 also constitutes a valve casing in which a valve 7 is located and is adapted to normally close against a seat 8 in the lower portion of the T-coupling. A dome 9 is provided on the upper end of the T-coupling and a diaphragm casing 10 is secured on the upper end of the dome 9. In this diaphragm casing 10 a diaphragm 11 is located and is secured to the stem 12 of valve 7.

A coiled spring 13 is provided in the lower portion of the diaphragm casing 10 and exerts upward pressure against the diaphragm 11 tending to press the diaphragm upwardly to open the valve 7. An opening 14 is formed in one wall of the trap casing 1 near its lower end, and a plate 15 is secured to the outer face of the trap over said opening 14 and formed with a screw threaded opening 16 for the reception of the externally threaded inner end 17 of a plug 18. This plug 18 constitutes a valve casing and is formed with a longitudinal bore of three different diameters. The outer bore 19, which is of the greatest diameter, is screw threaded throughout a portion of its length to receive a plug 20, the latter having a passage 21 therein connecting one end of the plug 20 with an annular passage 22 around the plug 20. Adjacent this largest bore 19, the plug 18 has a somewhat reduced bore 23 constituting a valve chamber, in which a valve 24 is located. The smallest diameter 25 of said bore, located at the inner portion of the plug 18, accommodates the stem 26 of valve 24, and it will be noted that the stem 26 is of appreciably less diameter than the bore 25 to allow a free flow of fluid through said bore into the valve chamber 23.

An angle lever 27 is pivotally connected to the bifurcated inner end of the plug 18, as shown at 28, and one end of this angle lever has an opening 29 to accommodate the stem 26, and a nut 30 is screwed onto the threaded inner end 31 of said valve stem 26 and is adapted to be engaged by one arm of the angle lever 27 to move the valve as will be hereinafter described.

It will be noted that the members of the angle lever 27 are at a slight acute angle to each other and that there is permitted a certain amount of lost motion in the movement of the lever before the lever engages the nut 30, hence, when the lever does engage the nut, it will exert a straight pull on the rod.

A rod 32 is secured to the horizontal arm of the angle lever 27 and supports a float 33 at its free end, the movement of the float 33 in the water in the trap serving to move the angle lever 27 and operate the valve 24 as will be explained.

The plug 18 is made with a passage 33' communicating with the annular passage 22 in the plug 20 and said plug 18 is also made with a passage 34 communicating with the valve chamber 23. A pipe 35 connects the passage 33' with the T-coupling 5 at a point above the valve 7, and a pipe 36 connects the passage 34 with the upper portion of the diaphragm casing 10.

The valve 24, above referred to, is of general cylindrical form and double-ended so that it operates to seat against the end of the passage 21 in plug 20 when in one position and to seat against the reduced bore at the other end of said valve chamber when the valve is in its other extreme position.

The valve 24 is made with a spiral or double spiral groove or passage 37, so that it is possible for the fluid to flow around the valve and is only stopped by the ends of the valve when said ends are seated.

In the top 2 of the trap casing 1 I provide my improved relief valve mechanism 38, which automatically permits air to escape from the trap when the air becomes excessive therein, and as this air relief valve forms the subject matter of one of my applications above referred to, it is needless to describe the same here in detail.

The operation of my improved trap is as follows: The drawing illustrates the float 33 in its lowest position when the trap is substantially empty and also illustrates valve 7 in closed position and valve 24 closing the passage 21 communicating with pipe 35, which connects the passage 21 with the T-coupling 5. When the valve 24 is in this position, the upper portion of the diaphragm casing 10 is in open communication with the trap casing by reason of the pipe 36 and the spiral groove 37 in valve 24 and connecting passages, so that any pressure which may be in the trap is communicated to the upper portion of the diaphragm casing to maintain the valve 7 in closed position.

As the float 33 rises by reason of the column of water in the trap, it will, after it reaches a predetermined height, cause the movement of the lever 27 sufficiently to exert a pull on the valve stem 26 to move the valve 24 to the right and seat this right-hand end of the valve against the right-hand end of the valve chamber 23. When the valve 24 is in this position, the upper end of the diaphragm casing 10 is in open communication with the T-coupling 5 by reason of the fact that the pipe 36 and passage 34 are connected by the spiral groove 37 of the valve 24 with the passage 21 and pipe 35, so that there will be a reduction of pressure in the upper end of the diaphragm 11 and the spring 13 will be permitted to act to lift the diaphragm 11 and the valve 7, thus opening the discharge pipe 4 into communication with the outlet pipe 6 and the pressure of steam in the trap casing 1 will serve to force the water through the passage 4 and outlet passage 6.

As the float 33 lowers, the valve 24 will move to the left not only by reason of the frictional engagement of the lever 27 therewith, but by reason of the pressure of the fluid in the trap, so that said valve will resume its position illustrated in the drawings and permit a flow of fluid under pressure through the pipe 36 to the upper portion of the diaphragm casing 10, thereby forcing the diaphragm 11 downwardly to close the valve 7 when the operation will be repeated as before.

In the initial operation of the trap, when the engineer or other operator turns on the steam, the cold air in the lines is driven ahead of the steam toward the trap and promptly escapes to the atmosphere through the open passage in the relief valve 38 above referred to, which constitutes a separate application for patent. When all the air in the trap is discharged, the water of condensation begins to accumulate in the trap and as it rises, the float rises with it until a height is reached when the latter operates the valve 24 as above explained, and the valve 24 is hereafter automatically controlled by the movement of the float to regulate the operation of the valve 7 and the outlet of water, as set forth.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A trap of the character stated, comprising a casing, an inlet pipe discharging into the casing, a discharge pipe discharging from the casing and communicating with the lower portion of the casing, a valve controlling the flow through said discharge pipe, a diaphragm casing, a diaphragm in the casing operatively connected to and controlling the said valve, a valve chamber communicating with the lower portion of the trap casing, a pair of pipes communicating with the valve chamber and connecting the latter with the diaphragm casing and with the discharge pipe above the first-mentioned valve respectively, a valve in said valve casing controlling the flow of fluid through said pipes, a stem on the last-mentioned valve, a pivotally supported angle lever operatively engaging the stem and adapted to cause the movement of said valve from one operative position to another, and a float operatively connected to said lever and located in the trap.

2. A trap of the character stated, comprising a casing, an inlet pipe discharging into the casing, a discharge pipe discharging from the casing and communicating with the lower portion of the casing, a valve controlling the flow through said discharge pipe, a diaphragm casing, a diaphragm in the casing operatively connected to and controlling the said valve, a valve chamber communicating with the lower portion of the trap casing, a pair of pipes communicating with the valve chamber and connecting the latter with the diaphragm casing and with the discharge pipe above the first-mentioned valve respectively, a valve in said valve casing controlling the flow of fluid through said pipes, and a float controlling the operation of said last-mentioned valve, said last-mentioned valve being double-ended and operating to close communication with the diaphragm casing and with the discharge pipe respectively and having a passage therein connecting the respective ends of the valve whereby communication is had between said pipes when the valve is in one of its extreme positions and permitting communication of one of said pipes with the trap casing when the valve is in the other of its extreme positions.

3. A trap of the character stated, comprising a casing, an inlet pipe discharging into the casing, a discharge pipe discharging from the casing and communicating with the lower portion of the casing, a valve controlling the flow through said discharge pipe, a diaphragm casing, a diaphragm in the casing operatively connected to and controlling the said valve, a valve chamber communicating with the lower portion of the trap casing, a pair of pipes communicating with the valve chamber and connecting the latter with the diaphragm casing and with the discharge pipe above the first-mentioned valve respectively, a valve in said valve casing controlling the flow of fluid through said pipes, a stem on the last-mentioned valve, a pivotally supported angle lever operatively engaging the stem and adapted to cause the movement of said valve from one operative position to another, and a float operatively connected to said lever and located in the trap, said last-mentioned valve being double-ended and operating to close communication with the diaphragm casing and with the discharge pipe respectively and having a passage therein connecting the respective ends of the valve whereby communication is had between said pipes when the valve is in one of its extreme positions and permitting communication of one of said pipes with the trap casing when the valve is in the other of its extreme positions.

4. A trap of the character described, comprising a casing, an inlet pipe communicating with the casing, a discharge pipe projecting upwardly through the top of the casing and terminating at its lower end at a point adjacent the bottom of the casing, a valve in said discharge pipe, a diaphragm casing, a diaphragm in the diaphragm casing, a stem connecting said valve and the diaphragm, a spring exerting upward pressure on the diaphragm and tending to open the valve, said trap having an outlet passage, a double-ended valve in said outlet passage, a float controlling the movement of the double-ended valve, pipes connecting said passage with the upper portion of the diaphragm casing and with the discharge pipe above said first-mentioned valve respectively, and said double-ended valve operating to control the flow of fluid to the diaphragm casing and from the diaphragm casing through said pipes to the discharge pipe.

5. In a trap of the character described, the combination with an outlet valve, a diaphragm casing, and a diaphragm in said casing controlling the movement of the valve, of means connecting the trap, and the diaphragm whereby pressure within the trap causes the movement of the diaphragm, a valve controlling communication with the diaphragm casing, a float operating said last-mentioned valve, and said last-mentioned valve having a spiral passage connecting the diaphragm casing and the outlet of the trap when said valve is in position to close direct communication between the trap and the diaphragm casing.

HENRY WILLIAM JUSTUS.